United States Patent
Hiratsuka

(10) Patent No.: US 10,573,881 B2
(45) Date of Patent: Feb. 25, 2020

(54) POSITIVE ELECTRODE ACTIVE MATERIAL FOR NONAQUEOUS ELECTROLYTE SECONDARY BATTERY

(71) Applicant: Panasonic Corporation, Osaka (JP)

(72) Inventor: Hidekazu Hiratsuka, Osaka (JP)

(73) Assignee: Panasonic Corporation, Osaka (JP)

( * ) Notice: Subject to any disclaimer, the term of this patent is extended or adjusted under 35 U.S.C. 154(b) by 104 days.

(21) Appl. No.: 15/367,134

(22) Filed: Dec. 1, 2016

(65) Prior Publication Data

US 2017/0250396 A1 Aug. 31, 2017

(30) Foreign Application Priority Data

Feb. 29, 2016 (JP) .................................. 2016-036978

(51) Int. Cl.
*H01M 4/131* (2010.01)
*H01M 4/505* (2010.01)
*H01M 4/525* (2010.01)
*C01G 53/00* (2006.01)
*H01M 10/0525* (2010.01)

(52) U.S. Cl.
CPC ............ *H01M 4/131* (2013.01); *C01G 53/50* (2013.01); *H01M 4/505* (2013.01); *H01M 4/525* (2013.01); *C01P 2002/60* (2013.01); *C01P 2002/72* (2013.01); *C01P 2002/76* (2013.01); *C01P 2004/03* (2013.01); *C01P 2006/10* (2013.01); *C01P 2006/19* (2013.01); *H01M 10/0525* (2013.01)

(58) Field of Classification Search
None
See application file for complete search history.

(56) References Cited

U.S. PATENT DOCUMENTS

| | | |
|---|---|---|
| 2001/0036578 A1 | 11/2001 | Nishida et al. |
| 2002/0142222 A1 | 10/2002 | Nishida et al. |
| 2003/0129495 A1 | 7/2003 | Yamato et al. |
| 2005/0220700 A1 | 10/2005 | Suhara et al. |
| 2005/0271944 A1 | 12/2005 | Suhara et al. |
| 2009/0035659 A1 | 2/2009 | Takeuchi et al. |

(Continued)

FOREIGN PATENT DOCUMENTS

| | | |
|---|---|---|
| JP | 10-308218 | 11/1998 |
| JP | 2004-220897 A | 8/2004 |

(Continued)

OTHER PUBLICATIONS

Non-Final Office Action issued in U.S. Appl. No. 14/601,457, dated Mar. 3, 2016.

(Continued)

*Primary Examiner* — Carmen V Lyles-Irving
(74) *Attorney, Agent, or Firm* — McDermott Will & Emery LLP

(57) ABSTRACT

A positive electrode active material for a nonaqueous electrolyte secondary battery is used for a nonaqueous electrolyte secondary battery. The positive electrode active material includes a composite oxide containing at least lithium, nickel, and manganese and contains aggregated particles of primary particles having an average particle diameter of 1.0 μm or more. The primary particles have a layered crystal structure and a spinel crystal structure.

3 Claims, 8 Drawing Sheets

(56) References Cited

U.S. PATENT DOCUMENTS

| | | |
|---|---|---|
| 2009/0057137 A1 | 3/2009 | Pitts et al. |
| 2009/0104530 A1 | 4/2009 | Shizuka et al. |
| 2010/0173202 A1 | 7/2010 | Saito et al. |
| 2010/0219370 A1 | 9/2010 | Nakamura et al. |
| 2010/0248040 A1 | 9/2010 | Saito et al. |
| 2010/0276217 A1 | 11/2010 | Sugaya et al. |
| 2011/0171529 A1 | 7/2011 | Kono et al. |
| 2011/0240913 A1 | 10/2011 | Kim et al. |
| 2012/0135319 A1 | 5/2012 | Saito et al. |
| 2012/0196185 A1* | 8/2012 | Kono .............. H01M 4/136 429/221 |
| 2012/0276446 A1 | 11/2012 | Kawai |
| 2013/0078520 A1 | 3/2013 | Toya et al. |
| 2013/0108920 A1 | 5/2013 | Oladeji |
| 2013/0146808 A1 | 6/2013 | Endo et al. |
| 2013/0164605 A1 | 6/2013 | Shimura et al. |
| 2013/0330609 A1 | 12/2013 | Sawa et al. |
| 2014/0079990 A1 | 3/2014 | Yanagida et al. |
| 2015/0221934 A1 | 8/2015 | Hiratsuka et al. |
| 2015/0243982 A1* | 8/2015 | Hiratsuka ......... H01M 4/505 429/223 |
| 2016/0013471 A1* | 1/2016 | Kaseda ............. H01M 4/505 429/223 |
| 2016/0118658 A1* | 4/2016 | Kawakami ......... H01M 4/505 429/224 |
| 2016/0248090 A1 | 8/2016 | Maeda et al. |

FOREIGN PATENT DOCUMENTS

| | | |
|---|---|---|
| JP | 2006-310181 A | 11/2006 |
| JP | 2007-220650 A | 8/2007 |
| JP | 2007-257885 A | 10/2007 |
| JP | 2008-152923 A | 7/2008 |
| JP | 2009-032681 A | 2/2009 |
| JP | 2010-129509 A | 6/2010 |
| JP | 2012-238581 A | 12/2012 |
| WO | 2004/082046 A1 | 9/2004 |
| WO | 2009/139157 A1 | 11/2009 |
| WO | 2012/039413 A1 | 3/2012 |
| WO | 2012/165207 A1 | 12/2012 |
| WO | 2012/169083 A1 | 12/2012 |
| WO | 2014/103166 | 7/2014 |

OTHER PUBLICATIONS

Final Office Action issued in U.S. Appl. No. 14/601,457, dated Aug. 26, 2016.
Non-Final Office Action issued in U.S. Appl. No. 14/962,986, dated Jan. 5, 2017.
Non-Final Office Action issued in U.S. Appl. No. 15/211,690, dated Dec. 29, 2016.
Specification and prosecution history of U.S. Appl. No. 15/211,690, filed Jul. 15, 2016.
Specification and prosecution history of U.S. Appl. No. 14/424,326, filed Feb. 26, 2015.
Office Action dated Nov. 8, 2016, issued in counterpart Japanese Application No. 2014-554091. 3 pages.
Notification of Transmittal of Translation of the International Preliminary Report on Patentabililty (Form PCT/IB/338) issued in counterpart International Application No. PCT/JP2013/006977 dated Jul. 9, 2015 with Forms PCT/IB/326, PCT/IB/373 and PCT/ISA/237, with English translation. (10 pages).
International Search Report dated Jan. 21, 2014, issued in corresponding Application No. PCT/JP2013/006977; with English translation.
Final Office Action issued in U.S. Appl. No. 14/962,986, dated Jun. 30, 2017.
Final Office Action issued in U.S. Appl. No. 15/211,690, dated Jun. 15, 2017.
Non-Final Office Action issued in U.S. Appl. No. 15/600,188, dated Jun. 16, 2017.

* cited by examiner

POSITIVE ELECTRODE ACTIVE MATERIAL FOR NONAQUEOUS ELECTROLYTE SECONDARY BATTERY

BACKGROUND

1. Technical Field

The present disclosure relates to a positive electrode active material for a nonaqueous electrolyte secondary battery, a nonaqueous electrolyte secondary battery, and a method for producing the positive electrode active material for a nonaqueous electrolyte secondary battery.

2. Description of the Related Art

Nonaqueous electrolyte secondary batteries are required to have both higher capacity and improved cycle characteristics. Therefore, a positive electrode for nonaqueous electrolyte secondary batteries each including a positive electrode active material layer formed on a positive electrode core is required to be improved in energy density by increasing the filling property of a positive electrode active material and to be improved in cycle characteristics by increasing the durability of the positive electrode active material.

International Publication No. 2014/103166 describes that a nonaqueous electrolyte secondary battery having a high energy density and excellent cycle characteristics can be provided by using a positive electrode active material having a powder breaking strength of 200 MPa or more and 500 MPa or less and having a crystallite diameter of 100 nm or more and 300 nm or less.

SUMMARY

However, the related art described above can improve the energy density but causes unsatisfactory safety.

In one general aspect, the techniques disclosed here feature a positive electrode active material for a nonaqueous electrolyte secondary battery including a composite oxide containing at least lithium, nickel, and manganese and containing aggregated particles of primary particles having an average particle diameter of 1.0 μm or more and. The primary particles have a layered crystal structure and a spinel crystal structure.

A positive electrode active material for a nonaqueous electrolyte secondary battery and a nonaqueous electrolyte secondary battery according to the present disclosure provide a nonaqueous electrolyte secondary battery having the suppressed oxygen releasability of a positive electrode active material, improved safety, a high filling density of the positive electrode active material, and high energy density.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
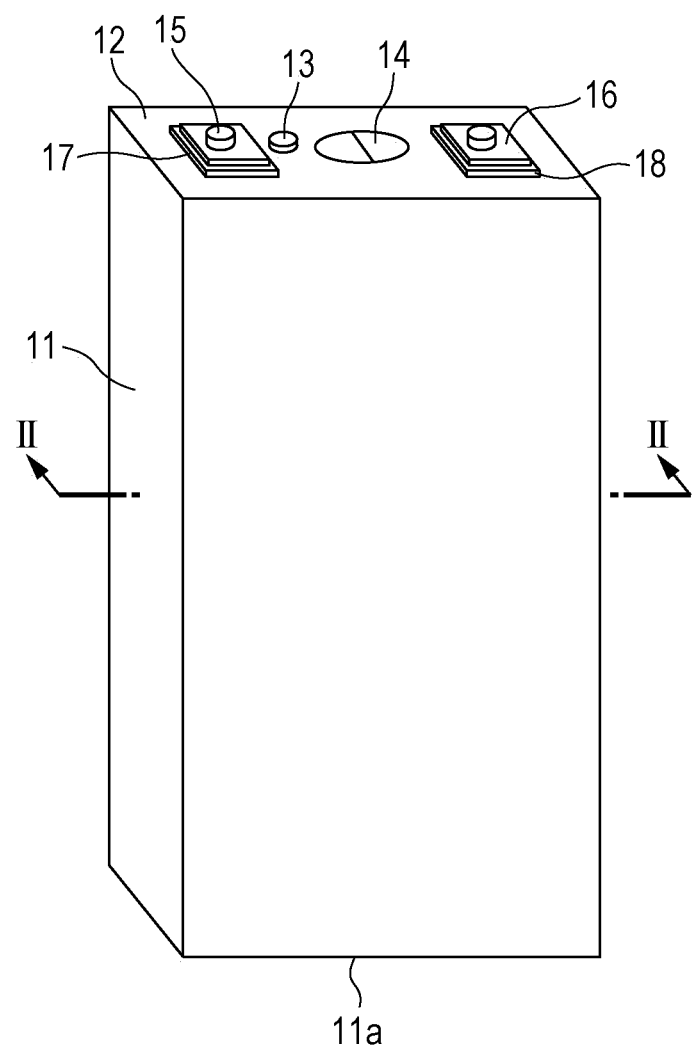
FIG. 1 is a perspective view of a nonaqueous electrolyte secondary battery as an example of an embodiment.

A positive electrode active material in a lithium-containing nonaqueous electrolyte secondary battery is changed in its crystal structure due to the extraction of lithium atoms constituting the crystal structure during charging. In particular, in a positive electrode filed with a positive electrode active material at a high density, the crystal structure of the positive electrode active material is considered to be more unstable when the internal temperature of the battery is increased by charging or overcharging under a high voltage, thereby releasing oxygen in the crystal structure. When the released oxygen reacts with carbon contained in a negative electrode, a nonaqueous electrolyte, or the like, the internal temperature may be further increased by heat of the reaction. Thus, the nonaqueous electrolyte secondary battery is required to have the suppressed oxygen releasability of the positive electrode active material and improved safety. The problem of oxygen release associated with destabilization of the crystal structure of the positive electrode active material for a nonaqueous electrolyte secondary battery is more important for a positive electrode active material and a nonaqueous electrolyte secondary battery in which the cycle characteristics at a high voltage are improved and the filling density of the positive electrode active material is increased as described in International Publication No. 2014/103166. This is considered to be because, at a high voltage, the crystal structure of the positive electrode active material easily becomes unstable due to the release of lithium atoms, and the oxygen concentration is high in proportion to the filling density of the positive electrode active material.

The inventor performed earnest research for solving a problem to decrease the oxygen releasability of a positive electrode active material under high-temperature conditions while maintaining a high filling property and excellent durability. As a result, it was found that when a positive electrode active material includes a composite oxide containing at least lithium, nickel, and manganese and contains aggregated particles of primary particles having an average particle diameter of 1.0 μm or more, and when the primary particles have a layered crystal structure and a spinel crystal structure, the problem described above can be solved, leading to the achievement of an embodiment of the present disclosure.

Also, the inventor found that in producing a positive electrode active material, a mixture containing lithium and a transition metal is usually fired only one time, but a positive electrode active material according to an embodiment of the present disclosure can be produced by dividing firing into two or more times. Specifically, the two or more times of firing include at least first firing of a mixture which contains a lithium compound and a transition metal compound containing nickel and manganese and which has a low lithium content, and second firing of a mixture prepared by adding a lithium compound to the precursor particles produced by the first firing so as to obtain a desired lithium-to-transition metal ratio.

The positive electrode active material according to the present disclosure is decreased in the oxygen releasability under a high-temperature condition while having a high filling property and excellent durability. Therefore, a nonaqueous electrolyte secondary battery having a high energy density, excellent cycle characteristics, and improved safety can be provided by using the positive electrode active material according to the present disclosure.

An example of an embodiment of the present disclosure is described in detail below by using the drawings. The drawings used for describing the embodiment are schematically shown and the dimensional ratios, etc. of constituent elements shown in the drawings may be different from actual ones. The specific dimensional ratios etc. should be determined in consideration of description below.

Figure 2:
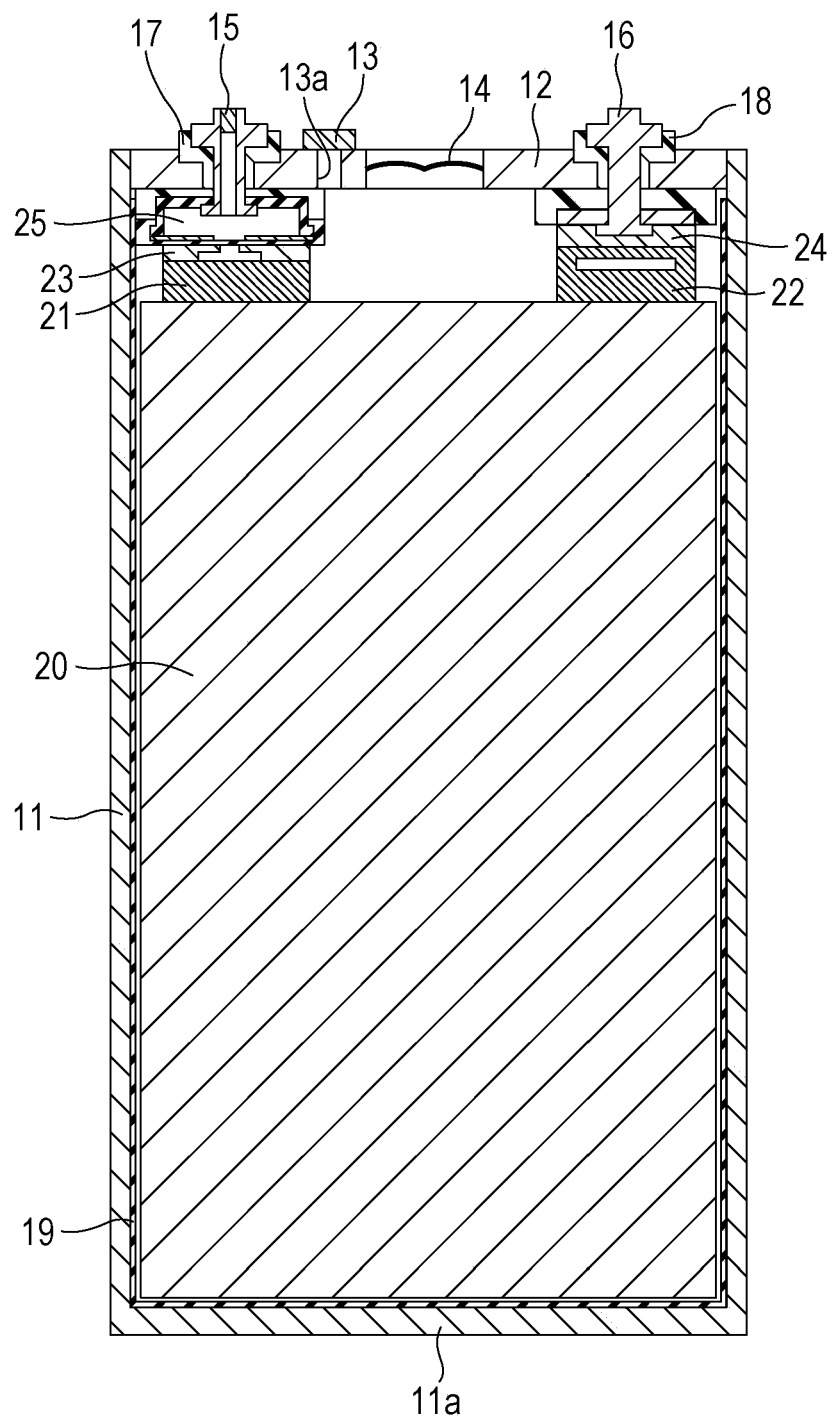
FIG. 2 is a cross-sectional view taken along line II-II in FIG. 1.

FIG. 1 is a perspective view of an example a nonaqueous electrolyte secondary battery 10 according to the embodiment. FIG. 2 is a cross-sectional view taken along line II-II in FIG. 1. The nonaqueous electrolyte secondary battery 10 includes a bottomed external case 11 having an opening, and a sealing plate 12 which seals the opening. The external case 11 is a bottomed cylindrical container in which an electrode body 20 including a positive electrode, which has an active material layer provided on a core, and a negative electrode is housed together with a nonaqueous electrolyte (not shown). The external case 11 has a bottom part 11a and the opening provided at a position facing the bottom part 11a. The sealing plate 12 is a lid body which seals the opening of the external case 11 and is provided with a liquid injection hole 13a for injecting the electrolyte, a sealing plug 13 which seals the liquid injection hole 13a, a gas exhaust valve 14, a positive electrode external terminal 15, and a negative electrode external terminal 16. The gas exhaust valve 14 is provided for discharging the gas inside the battery to the outside of the battery.

The positive electrode external terminal 15 has the function of electrically connecting an external element to the positive electrode. The negative electrode external terminal 16 has the function of electrically connecting an external element to the negative electrode. The positive electrode external terminal 15 is provided on the sealing plate 12 in a state of being electrically insulated from the sealing plate 12 through an insulating gasket 17. The negative electrode external terminal 16 is provided on the sealing plate 12 in a state of being electrically insulated from the sealing plate 12 through an insulating gasket 18. The gaskets 17 and 18 are desirably made of a resin.

The electrode body 20 is housed in the external case 11 in a state in which the side surface and bottom are covered with an insulating sheet 19. The insulating sheet 19 is desirably, for example, folded into a box shape along the inner wall of the external case 11, or such a bag as to cover the electrode body 20 is desirably used.

In the electrode body 20, a positive electrode tab 21 is disposed at one of the ends on the sealing plate 12 side, and a negative electrode tab 22 is disposed at the other end on the sealing plate 12 side. A positive electrode current collector lead 23 is bonded to the positive electrode tab 21. A negative electrode current collector lead 24 is bonded to the negative electrode tab 22. The positive electrode current collector lead 23 is electrically connected to the positive electrode external terminal 15 through a current breaking mechanism 25. The negative electrode current collector lead 24 is electrically connected to the negative electrode external terminal 16.

Figure 3:
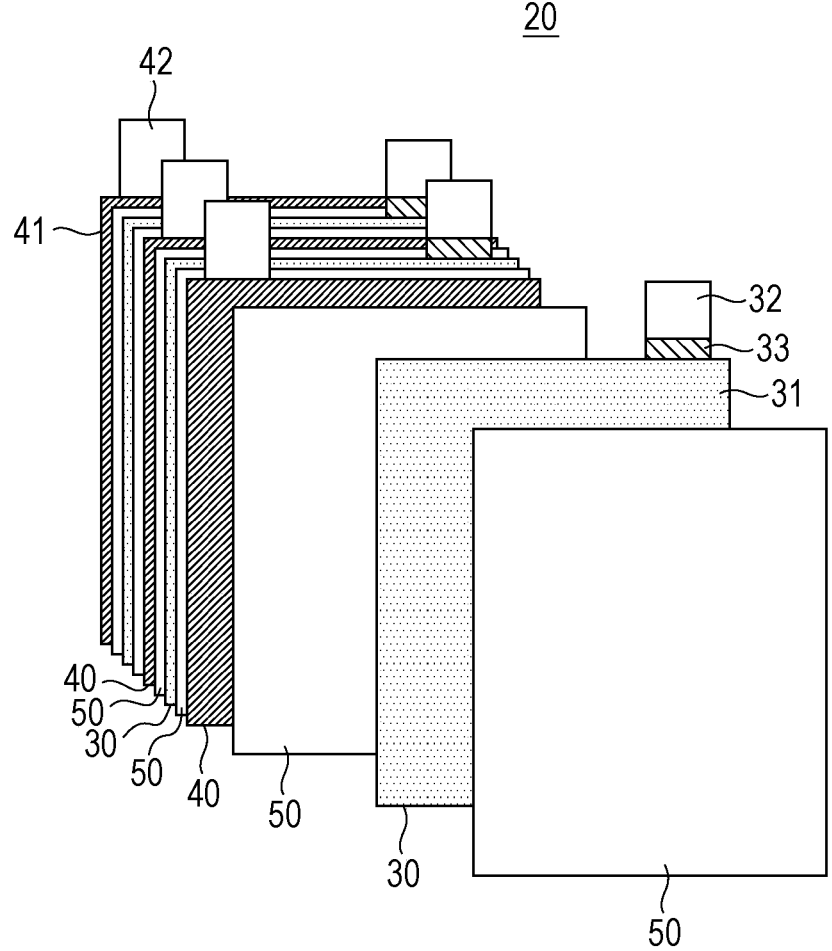
FIG. 3 is a schematic diagram of an electrode body in a nonaqueous electrolyte secondary battery as an example of an embodiment.

FIG. 3 is a schematic view of the electrode body 20 as an example of the embodiment. The electrode body 20 includes the plate-shaped positive electrode 30 containing a positive electrode active material, the plate-shaped negative electrode 40, and a separator 50 disposed between the positive electrode 30 and the negative electrode 40. As illustrated in FIG. 3, the positive electrode 30, the negative electrode 40, and the separator 50 constitute the stacked electrode body 20 in which the positive electrode 30 and the negative electrode 40 are stacked with the separator 50 disposed therebetween.

In the stacked electrode body 20, the positive electrode 30 has a square region in which a positive electrode active material layer 31 is formed on each of both surfaces of a positive electrode core and also has a positive electrode core exposed portion 32 provided at one of the ends of one side of the aqueous region. A plurality of positive electrode core exposed portions 32 are stacked to constitute the positive electrode tab 21. In addition, an insulating layer or a protective layer having higher electrical resistance than the positive electrode core is provided in a root portion 33 which is a portion of contact between the positive electrode core exposed portion 32 and the square region having the positive electrode active material layer 31 formed therein.

In the stacked electrode body 20, the negative electrode 40 has a square region in which a negative electrode active material layer 41 is formed on each of both surfaces of a negative electrode core and also has a negative electrode core exposed portion 42 provided at the end different from the end provided with the positive electrode core exposed portion 32 in one side of the aqueous region. A plurality of negative electrode core exposed portions 42 are stacked to constitute the negative electrode tab 22. From the viewpoint of lithium acceptability during charging, the area of the plate-shaped negative electrode 40 is desirably slightly larger than the area of the plate-shaped positive electrode 30.

In the stacked electrode body 20, for example, when the number of the positive electrodes 30 prepared is larger than by one that of the negative electrodes prepared, and the positive electrodes 30 and the negative electrodes 40 are alternately stacked with the separators 50 interposed between the positive electrodes 30 and the negative electrodes 40, the electrode body 20 in which the positive electrodes 30 are disposed at both ends is produced. Also, the stacked electrode body 20 may be produced by disposing the positive electrode 30 between the two separators 50, welding the peripheries of the two separators 50 to form a bag-like separator, and then stacking the positive electrodes 30 each contained in the bag-like separator 50 and the negative electrodes 40.

In the stacked electrode body 20, the positive electrodes 30, the negative electrodes 40, and the separators 50 are desirably fixed in a stacked state. The positive electrodes 30, the negative electrodes 40, and the separators 50 may be fixed by, for example, winding a fixing member such as an insulating tape or the like on the electrode body 20. Alternatively, the positive electrodes 30, the negative electrodes 40, and the separators 50 may be fixed by bonding the separators 50 and the positive electrodes 30 and the separators 50 and the negative electrodes 40 through adhesive layers provided on the respective separators 50.

When the nonaqueous electrolyte secondary battery 10 includes the stacked electrode body 20 as shown in FIG. 3, the dead space is small as compared with a winding electrode body formed by winding a positive electrode and a negative electrode. Also, unlike in the winding electrode body, cracking or the like is not caused in the positive electrode active material layer by bending of the positive electrode. Thus, the filling density of the positive electrode active material in the positive electrode active material layer can be more increased, thereby permitting the production of the nonaqueous electrolyte secondary battery 10 having a more improved energy density. From the viewpoint described above, the nonaqueous electrolyte secondary battery 10 according to the embodiment desirably includes the positive electrode 30 having an active material density of, for example, 3.5 g/cm² or more.

Although the nonaqueous electrolyte secondary battery 10 including the stacked electrode body 20 has the advantages described above, the oxygen content is increased in proportion to the positive electrode active material because the external case 11 contains the positive electrode active material at a high density, and the released oxygen is likely to bypass the separator and easily reach the negative electrode. Therefore, it is considered to be necessary that consideration is more given to safety. Thus, using the positive electrode active material with the suppressed oxygen releasability according to the embodiment is considered to be more effective for the nonaqueous electrolyte secondary battery 10 including the stacked electrode body 20.

In the nonaqueous electrolyte secondary battery 10 of the present disclosure, the stacked electrode body 20 as shown in FIG. 3 is only an example, and another configuration, for example, a winding electrode body, may be provided, which is formed by winding the positive electrode and the negative electrode through the separator and then molding into a flat or cylindrical shape.

Each of the constituent members of the nonaqueous electrolyte secondary battery 10 is described in detail below.
[Positive Electrode]

The positive electrode 30 includes the positive electrode core such as a metal foil or the like, and the positive electrode active material layer formed on the positive electrode core. For example, a metal foil stable within the potential range of the positive electrode, a film having the metal disposed in a surface layer thereof, or the like is used as the positive electrode core. Examples of a metal which is desirably used for the positive electrode core include aluminum and aluminum alloys. The positive electrode active material layer contains at least a composite oxide used as the positive electrode active material, and desirably contains a conductive agent, a binder, and the like in addition to the positive electrode active material.

The positive electrode 30 can be formed by, for example, applying a positive electrode mixture slurry containing the positive electrode active material, the conductive agent, the binder, and the like on the positive electrode core, drying the resultant coating film, and compressing (rolling) the dry coating film to form the positive electrode active material layer on each of the both sides of the positive electrode core.

In forming the positive electrode 30 by using the positive electrode active material as an example of the embodiment, the positive electrode containing the positive electrode active material at a high filling density can be formed by adjusting the composition and amount of the positive electrode mixture slurry applied and compressing the resultant dry coating film under high pressure (for example, 200 MPa or more). The positive electrode 30 containing the positive electrode active material at a filling density of 3.5 g/cm² or more is desired because a nonaqueous electrolyte secondary battery having a high energy density can be produced.
[Positive Electrode Active Material]

The positive electrode active material includes a composite oxide (also referred to as a "lithium composite oxide" hereinafter) containing lithium, nickel, and manganese. The lithium composite oxide can be represented by general formula $LiNi_xMn_yM_{(1-x-y)}O_2$. In the formula, M is at least one element selected from the transition metal elements excluding lithium (Li), nickel (Ni), and manganese (Mn). In the formula, x represents the content (molar ratio) of Ni relative to the total amount of Ni, Mn, and M and is, for example, $0.3 \leq x < 0.9$. In the formula, y represents the content (molar ratio) of Mn relative to the total amount of Ni, Mn, and M and is, for example, $0.01 \leq y \leq 0.5$.

The lithium composite oxide contains manganese and may contain manganese at a molar ratio of, for example, 0.01 or more and 0.5 or less relative to the total amount of transition metals (in the general formula above, Ni, Mn, and M) as described above. When the lithium composite oxide contains manganese at a content within the range described above, it is possible to produce the positive electrode active material containing aggregated particles of primary particles having a layered crystal structure and a spinel crystal structure as described below. It is also desired from production cost, safety, and the like that the lithium composite oxide contains manganese at a content within the range described above.

The lithium composite oxide contains nickel and may contain nickel at a molar ratio of, for example, 0.3 or more and less than 0.9 relative to the total amount of transition metals (in the general formula above, Ni, Mn, and M) as described above. It is also desired from production cost, higher capacity, and the like that the lithium composite oxide contains nickel at a content within the range described above.

Examples of the transition metal element M in the general formula include cobalt (Co), magnesium (Mg), boron (B), calcium (Ca), chromium (Cr), zirconium (Zr), molybdenum (Mo), tungsten (W), aluminum (Al), vanadium (V), cerium (Ce), titanium (Ti), iron (Fe), potassium (K), phosphorus (P), bismuth (Bi), gallium (Ga), indium (In), and the like. The lithium composite oxide desirably contains as the transition metal element M at least one element selected from the group consisting of these elements.

From the viewpoint of accelerating the crystal growth of the multilayered crystal structure, the lithium composite oxide desirably contains cobalt and more desirably contains cobalt at a molar ratio of, for example, more than 0.01 and 0.4 or less relative to the total amount of transition metals (in the general formula above, Ni, Mn, and M).

Desired examples of the lithium composite oxide include $LiNi_{0.33}Co_{0.33}M_{0.33}O_2$, $LiNi_{0.5}Co_{0.2}M_{0.3}O_2$, and the like.

The lithium composite oxide represented by the general formula and used as the positive electrode active material in the embodiment is not necessarily limited to having a strict molar ratio of 1:1:2 among lithium, a total of transition metals (Ni, Mn, and M), and oxygen atoms. In the present disclosure, for example, a lithium composite oxide containing lithium and oxygen atoms at a molar ratio of 0.95 or more and 1.05 or less and a molar ratio of 1.9 or more and 2.1 or less, respectively, relative to the total amount of the transition metals can be handled as being included in the lithium composite oxide represented by the general formula.

The composition of the lithium composite oxide used as the positive electrode active material can be measured by using an ICP (inductively coupled plasma) emission spectrophotometer (for example, trade name "iCAP6300" manufactured by Thermo Fisher Scientific Inc.) or the like.

The structure of the positive electrode active material according to the embodiment is described in detail. The positive electrode active material includes aggregated particles of primary particles, that is, particles formed by aggregation of a plurality of primary particles. The primary particles constituting the positive electrode active material have an average particle diameter of 1.0 μm or more and have the layered crystal structure and the spinel crystal structure therein.

The primary particles constituting the positive electrode active material desirably have an average particle diameter of 1.0 μm or more and 5 μm or less. With the primary particles having an average particle diameter of less than 1.0 μm, the contact area between the primary particles is decreased, and thus cleavage may occur at the interfaces between the primary particles during compression or charging/discharging, there by degrading battery characteristics. While with the primary particles having an average particle diameter of more than 5 μm, the amount of internal air grains of secondary particles is increased, and thus the filling property may be degraded.

The average particle diameter of the primary particles constituting the positive electrode active material can be determined by measuring the shape using a scanning electron microscope (SEM). Specifically, 10 particles are randomly selected from a particle image obtained by observing lithium composite oxide particles with SEM at a magnification of 2000 times. Each of the primary particles is determined by observing the grain boundaries of the ten selected particles. The particle maximum diameters are determined as the maximum diameters of the primary particles, and the average value of the particle maximum diameters of the 10 primary particles is regarded as the average particle diameter of the primary particles constituting the positive electrode active material.

The primary particles constituting the positive electrode active material according to the embodiment have a layered crystal structure and a spinel crystal structure. When the primary particles constituting the positive electrode active material according to the embodiment have a spinel crystal structure having a stronger bond between metal atom and oxygen atom, the oxygen releasing ability under a high-temperature condition can be suppressed. The spinel crystal structure contained in the positive electrode active material according to the embodiment is considered to be mainly derived from lithium manganate ($LiMn_2O_4$) crystallites having a spinel crystal structure belonging to the space group Fd-3m.

On the other hand, the layered crystal structure is a structure in which a transition metal and lithium are regularly arranged to form a two-dimensional plane, and lithium is two-dimensionally diffused, and a high energy density can be obtained as compared with the spinel crystal structure. Therefore, the primary particles constituting the positive electrode active material according to the embodiment desirably has the layered crystal structure together with the spinel crystal structure.

From the viewpoint of balance between safety and energy density, the content of crystallites having the spinel crystal structure in the positive electrode active material is more desirably 0.1% by mass or more and 5% by mass or less and particularly desirably 0.5% by mass or more and 1.0% by mass or less relative to the total of the primary particles. When the content of crystallites having the spinel crystal structure is in the range described above, the content of crystallites having the layered crystal structure is desirably 95% by mass or more and 99.9% by mass or less relative to the total of the primary particles.

It can be analyzed and identified by a known method based on powder X-ray diffractometry that the primary particles constituting the positive electrode active material have the layered crystal structure and the spinel crystal structure. For example, the presence of the layered crystal structure in the primary particles can be confirmed by detecting the diffraction peaks of (101) plane and (104) plane of the layered crystal structure which appear near diffraction angles (2θ)=36.7° and 44.5° in an X-ray diffraction pattern of the positive electrode active material.

Also, for example, the presence of the spinel crystal structure in the primary particles can be confirmed by detecting the diffraction peaks belonging to the apace group Fd-3m which appear near diffraction angles (2θ)=19°, 37°, and 45° in an X-ray diffraction pattern of the positive electrode active material. Further, the amount of crystallites having each of the crystal structures in the primary particles can be determined by a known method of comparing the peak intensity of each of the diffraction peaks with an X-ray diffraction pattern of a standard sample.

The positive electrode active material of the embodiment can be produced by, for example, a method described below.

The positive electrode active material according to the embodiment can be produced by a method including two or more times of firing including first firing of a first mixture containing a lithium compound and a transition metal compound and second firing of a second mixture produced by further adding a lithium compound to the precursor particles produced by the first firing. The lithium content in the first mixture corresponds to a molar ratio of less than 0.5 to the total amount of the transition metals. The lithium content in the second mixture corresponds to a molar ratio of 0.9 or more and 1.1 or less to the total amount of the transition metals.

The first mixture subjected to the first firing contains at least the lithium compound and the transition metal compound containing at least nickel and manganese, and the lithium compound and the transition metal compound are adjusted to such amounts that the molar ratio of lithium to the transition metals is less than 0.5. The lithium ratio to the transition metals in the first mixture is desirably 0.1 or more and less than 0.45.

Examples of the lithium compound contained in the first mixture include $Li_2CO_3$, LiOH, $Li_2O_3$, $Li_2O$, $LiNO_3$, $LiNO_2$, $LiOH.H_2O$, LiH, LiF, and the like.

The transition metal compound contained in the first mixture contains at least Ni and Mn. Examples of the transition metal compound include a Ni compound, a Mn compound, a MnNi compound, transition metal compounds other than Mn and Ni compounds (for example, a Co compound, an Al compound, and the like), compounds containing Mn and Ni and another transition metal (for example, Co, Al, or the like), and the like. A compound containing Ni, Mn, and Co is desirably used as the transition metal compound contained in the first mixture, and examples thereof include $Ni_{0.33}Co_{0.33}M_{0.33}(OH)_2$, $Ni_{0.5}Co_{0.2}M_{0.3}(OH)_2$, and the like.

In the first firing, first firing is performed at a low lithium content relative to the metal transition metals to prepare precursor particles including aggregated articles of primary particles in which the spinel crystal structure based on lithium manganate (LiMn$_2$O$_4$) is formed. The primary particle diameter of the precursor particles prepared by the first firing, the content ratio of the spinel crystal structure, etc. can be adjusted according to the composition of the first mixture, firing conditions of the first firing, and the like.

In the first firing, the firing temperature is desirably 600° C. or more and 950° C. or less, and the firing time is desirably 1 hour or more and 10 hours or less.

Then, lithium is added to the precursor particles prepared by the first firing to prepare the mixture to be subjected to second firing. The mixture to be subjected to second firing is prepared by adding lithium in such an amount that the total molar ratio of lithium to the transition metals other than lithium contained in the precursor is 0.9 or more and 1.1 or less. Therefore, when the mixture subjected to the first firing contains lithium in such an amount that the molar ratio to the transition metals other than lithium is 0.4, lithium is added in such an amount that the molar ratio to the transition metals other than lithium contained in the precursor is 0.5 or more and 0.7 or less.

In the second firing, the mixture prepared by adding lithium is fired. In the second firing, the spinel crystal structure is considered to remain in the primary particles, while the lithium added enters the inside of the primary particles and gaps between the primary particles to grow the layered crystal structure. This is considered to result in the preparation of the lithium composite oxide particles which include aggregates of the primary particles with a proper average particle diameter and in which the spinel crystal structure and the layered crystal structure are mixed. On the other hand, the lithium composite oxide particles prepared by the second firing are considered to be substantially the same as the precursor particles prepared by the first firing with respect to the dimensions of the whole particles and the dimensions of the primary particles.

The lithium compound contained in the second mixture may be the same as or different from the lithium compound contained in the first mixture. Examples of the lithium compound contained in the second mixture include the compounds exemplified as the lithium compound contained in the first mixture described above. In the second firing, the firing temperature is desirably 700° C. or more and 1000° C. or less, and the firing time is desirably 5 hours or more and 20 hours or less.

The production method including the first firing, the addition of lithium, and the second firing can produce the positive electrode active material which has particle hardness (compression breaking strength) durable for high pressure and the primary particle diameter appropriate for obtaining a high capacity, and in which the oxygen releasability is more suppressed. By using the positive electrode active material, it is possible to produce a nonaqueous electrolyte secondary battery which includes the positive electrode active material layer filled at a higher filling ratio without causing a crack and which has a high energy density, excellent cycle characteristics, and improved safety.

From the viewpoint that the oil absorption of the positive electrode active material is 20 cm$^3$/100 g or less, the amount of the lithium compound added prior to the second firing is desirably such an amount that the molar ratio of the total amount of lithium to the transition metals contained in the precursor is 0.9 or more and 1.05 or less. The oil absorption of the positive electrode active material serves as an index correlated with the volume of gaps between the primary particles in the particles. It is considered that when the oil absorption of the positive electrode active material is 20 cm$^3$/100 g or less, the positive electrode active material having the high filling property can be produced.

The oil absorption can be determined according to a DBP (dibutyl phthalate) absorption amount method A (mechanical method) defined in JIS K-6217-4 "Carbon black for rubber industry—Fundamental characteristics—Part 4: Determination of DBP absorption number". Specifically, DBP is added at a rate of 4 cm$^3$/min to positive electrode active material particles stirred with two blades. At this time, a change in viscosity characteristic is detected by a torque detector, and the output thereof is converted to torque by a microcomputer. The oil absorption can be determined by converting the DBP amount corresponding to the torque at 100% of the maximum torque generated to a DBP amount per 100 g of the positive electrode active material particles. The oil absorption of the positive electrode active material can be measured by, for example, using an absorption tester (model name "S-500" manufactured by Asahisouken Co., Ltd.) or the like.

The other characteristics of the positive electrode active material according to the embodiment are described.

The hardness of the positive electrode active material is correlated with the closeness of the primary particles constituting the positive electrode active material. An index for evaluating the degree of hardness of the positive electrode active material is the compression breaking strength (St) of the positive electrode active material. The compression breaking strength can be calculated by the formula St=2.8P/$\pi d^2$ (wherein P: load applied to particles, d: particle diameter) described in "Journal of the Mining and Metallurgical Institute of Japan", Vol. 81, No. 932, December in 1965, pp. 1024-1030.

The compression breaking strength is calculated by dividing by the square of the particle diameter and thus has the high dependency on the particle diameter, and the resultant compression breaking strength increases with decreases in the particle diameter. Therefore, in evaluating the particle hardness by using the compression breaking strength, the compression breaking strength is desirably defined with the predetermined particle diameter. The compression breaking strength of the positive electrode active material can be measured by using, for example, a micro compression testing machine (model name "MCT-211" manufactured by Shimadzu Corporation) or the like.

For example, when the particle diameter is regulated to be 5 μm or more and 30 μm or less, the compression breaking strength of the positive electrode active material is desirably 150 MPa or more and 500 MPa or less. This Is because within the range, when the positive electrode active material layer containing particles of the lithium composite oxide is formed, the filling rate of the positive electrode active material layer can be increased by compression (rolling) under high pressure, resulting in the realization of a higher battery capacity.

The primary particles contained in the positive electrode active material contain crystallites having a single crystal structure such as the layered crystal structure, the spinel crystal structure, or the like. The crystallite size is the crystallite diameter of the crystallites. The crystallite size is calculated by the Le Bail method through Rietveld analysis according to Topas Version 4 based on a powder X-ray diffraction pattern measured by, for example, using a powder X-ray diffraction measurement device (D8 advance diffractometer manufactured by Brukar AXS K. K.).

The measurement conditions of X-ray diffraction are as follows.
- X-ray source: CuKα1 (wavelength: 1.5418 Å)
- Detector: PSD (LYNX EYE)
- X-ray output: 40 kV×40 mA
- Goniometer radius: 250 mm
- Operation axis: 2θ/θ
- Measurement method: continuous
- Counting unit: CPS
- Scanning speed: 0.03°/second
- Start angle: 10°, Finish angle: 100°

The crystallite size of the crystallites contained in the primary particles and determined as described above is desirably 80 nm or more and 220 nm or less from the viewpoint of improving ion conductivity and thus improving the energy density or the like.

The volume-average particle diameter (D50) of the positive electrode active material is desirably 5 μm or more and 30 μm or less from the viewpoint of facilitating the formation of the positive electrode including the positive electrode active material filled at a higher ratio. The volume-average particle diameter (D50) of the positive electrode active material is measured by using a laser diffraction scattering particle size distribution analyzer (trade name "LA-920" manufactured by Horiba, Ltd.) using water as a dispersion medium. The volume-average particle diameter (D50) represents a median diameter at a cumulative volume value of 50% in a particle size distribution.

The surface roughness of the positive electrode active material depends on the primary particle diameter and the closeness of the primary particles. The surface roughness (%) is calculated by using the formula for surface roughness described in International Publication No. 2011/125577. The formula is as follows.

(Surface roughness)={(maximum value of change in particle radius per degree)/(maximum particle diameter)}×100

In shape measurement based on a SEM image of the positive electrode active material, the particle radius is determined as a distance from a center defined as a point that divides the maximum diameter into equal parts to each of points in the periphery of a particle. A change in particle radius per degree is an absolute value, and the maximum value thereof is the maximum change per degree measured in the entire periphery of a particle. In the present disclosure, the surface roughness of the positive electrode active material is an average value of surface roughness calculated from 10 positive electrode active material particles. From the viewpoint of improving the filling property of the positive electrode active material in the positive electrode active material layer, the surface roughness of the positive electrode active material is desirably 4% or less.

[Conductive Agent]

The conductive agent is used for enhancing the electric conductivity of the positive electrode active material layer. Examples of the conductive agent include carbon materials such as carbon black, acetylene black, ketchen black, graphite, and the like. These may be used alone or in combination of two or more.

[Binder]

The binder is used for maintaining a good contact state between the positive electrode active material and the conductive agent and for enhancing the binding property of the positive electrode active material or the like to the surface of the positive electrode core. Examples of the binder include polytetrafluoroethylene (PTFE), polyvinylidene fluoride (PVdF), modified products thereof, and the like. The binder may be used in combination with a thickener such as carboxymethyl cellulose (CMC), polyethylene oxide (PEO), or the like.

[Negative Electrode]

The negative electrode 40 includes a negative electrode core such as a metal foil or the like, and a negative electrode active material layer formed on the negative electrode core. For example, a metal foil stable within the potential range of the negative electrode, a film having the metal disposed in a surface layer thereof, or the like is used as the negative electrode core. Examples of a metal which is desirably used for the negative electrode core include copper and copper alloys. The negative electrode active material layer contains at least a negative electrode active material which can reversibly occlude and release lithium ions and desirably contains a binder in addition to the negative electrode active material. Like in the positive electrode 30, PTFE or the like can be used as the binder, but a styrene-butadiene copolymer (SBR) or a modified product thereof or the like is desirably used. The binder may be used in combination of a thickener such as CMC or the like.

Examples of the negative electrode active material which can be used include natural graphite such as graphite, artificial graphite, lithium, silicon, silicon compounds, carbon, tin, germanium, aluminum, lead, indium, gallium, lithium alloys, carbon and silicon previously occluded with lithium, and alloys, mixtures, and the like thereof. Among these, a mixture of graphite and $SiO_x$ (0.8≤x≤1.2) is desired from the viewpoint of high capacity. In this case, the content of $SiO_x$ is desirably 5% to 15% and particularly desirably 7% relative to the total amount of graphite and $SiO_x$.

[Separator]

For example, a porous sheet having ion permeability and insulation is used as the separator 50. Examples of the porous sheet include microporous thin films, woven fabrics, nonwoven fabrics, and the like. The material of the separator 50 is desirably a polyolefin such as polyethylene, polypropylene, or the like.

[Nonaqueous Electrolyte]

The nonaqueous electrolyte contains a nonaqueous solvent and an electrolyte salt dissolved in the nonaqueous solvent. The nonaqueous electrolyte is not limited to a liquid electrolyte (electrolyte solution) and may be a solid electrolyte using a gel polymer or the like.

Examples of the nonaqueous solvent which can be used include cyclic carbonate esters generally used as a nonaqueous solvent, such as ethylene carbonate (EC) and the like; chain esters such as dimethyl carbonate (DMC), diethyl carbonate (DEC), and the like; carboxylate esters such as γ-butyrolactone (GBL) and the like; cyclic ethers such as crown ether and the like; chain ethers; nitriles; amides; halogen-substituted products produced by substituting a hydrogen atom of each of these nonaqueous solvents with a halogen atom; mixed solvents thereof; and the like. Among these, a mixture of a cyclic carbonate ester which is a high-dielectric-constant solvent and a chain ester which is a low-viscosity solvent is desirably used.

The electrolyte salt is desirably a lithium salt. A general lithium salt usually used as a supporting salt in usual nonaqueous electrolyte secondary batteries can be used as the lithium salt. Examples of the lithium salt include $LiPF_6$, $LiBF_4$, $LiAsF_6$, $LiClO_4$, $LiCF_3SO_3$, $LiN(FSO_2)_2$, $LiN(C_lF_{2l+1}SO_2)(C_mF_{2m+1}SO_2)$ (l and m are each an integer of 1 or more), $LiC(C_pF_{2p+1}SO_2)(C_qF_{2q+1}SO_2)(C_rF_{2r+1}SO_2)$ (p, q, and r are each an integer of 1 or more), $Li[B(C_2O_4)_2]$ (lithium bis(oxalate)borate (LiBOB)), $Li[B(C_2O_4)F_2]$, Li[P $(C_2O_4)F_4]$, $Li[P(C_2O_4)_2F_2]$, and the like. These lithium salts may be used alone or in combination of two or more.

The nonaqueous electrolyte may contain an additive. For example, an additive is used for the purpose of forming good films on the positive electrode and the negative electrode. Examples of such an additive include vinylene carbonate (VC), ethylene sulfite (ES), cyclohexylbenzene (CHB), modified products thereof, and the like. The additives may be used alone or in combination of two or more. The ratio of the additive is not particularly limited but is desirably about 0.05% to 10% by mass relative to the nonaqueous electrolyte.

EXAMPLES

An example of the embodiment is described in detail below in examples, but the present disclosure is not limited to the examples below.

Example 1

[Formation of Positive Electrode]

$Li_2CO_3$ and $Ni_{0.33}Co_{0.33}Mn_{0.33}(OH)_2$ were mixed so that the molar ratio of Li relative to the total amount of Ni, Co, and Mn was 0.4. Then, the resultant mixture was maintained at 900° C. for 5 hours (first firing) to prepare a precursor of lithium composite oxide A1.

Next, to the precursor, $Li_2CO_3$ was added in such an amount that the molar ratio of Li relative to the total amount of Ni, Co, and Mn in the precursor of lithium composite oxide A1 was 0.65, and then both were mixed. Then, the resultant mixture was maintained at 950° C. for 10 hours (second firing) to prepare the lithium composite oxide A1.

Figure 4:
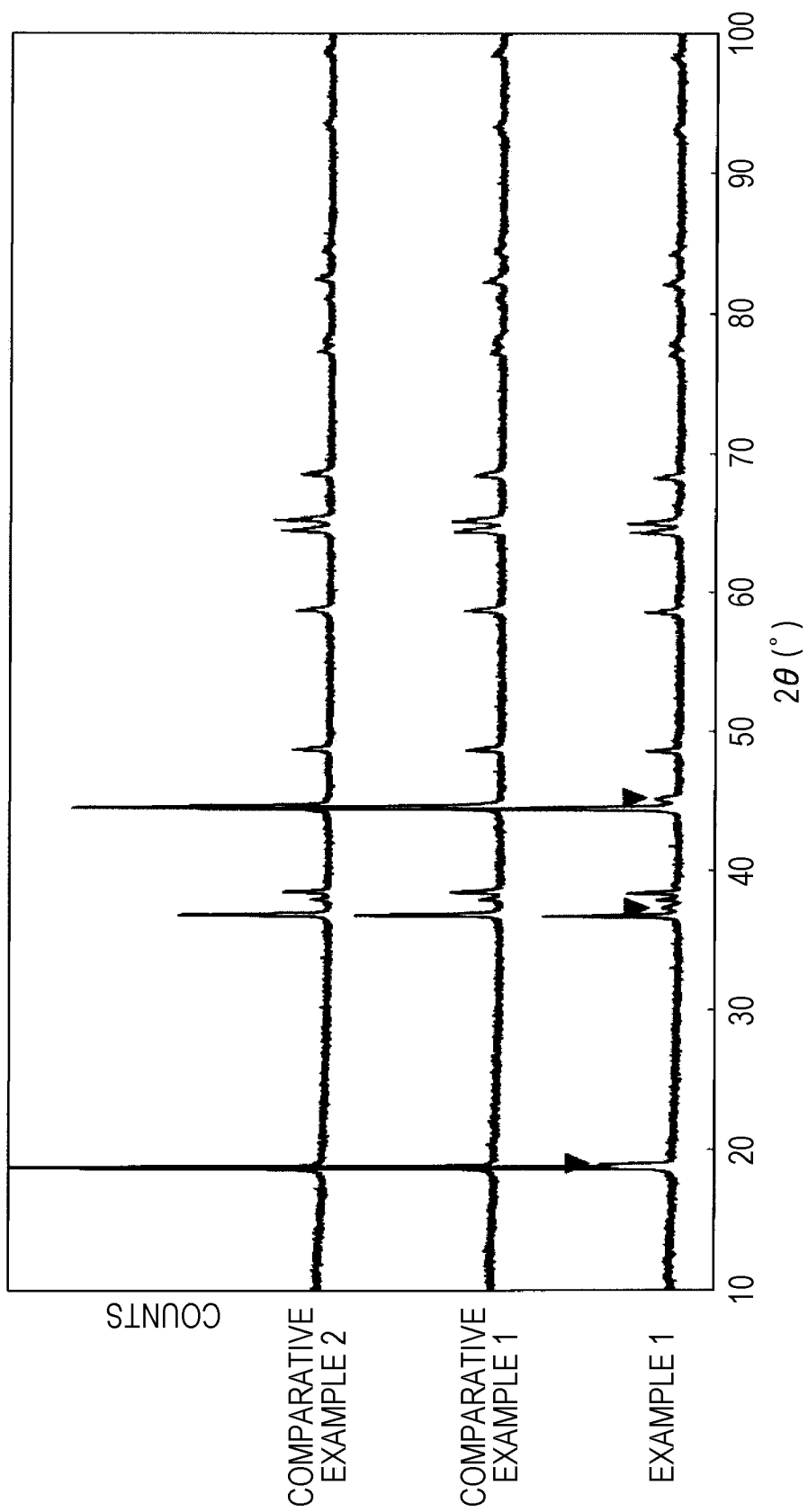
FIG. 4 is a graph showing a powder X-ray diffraction pattern of a lithium composite oxide produced in each of an example and comparative examples.
Figure 5:
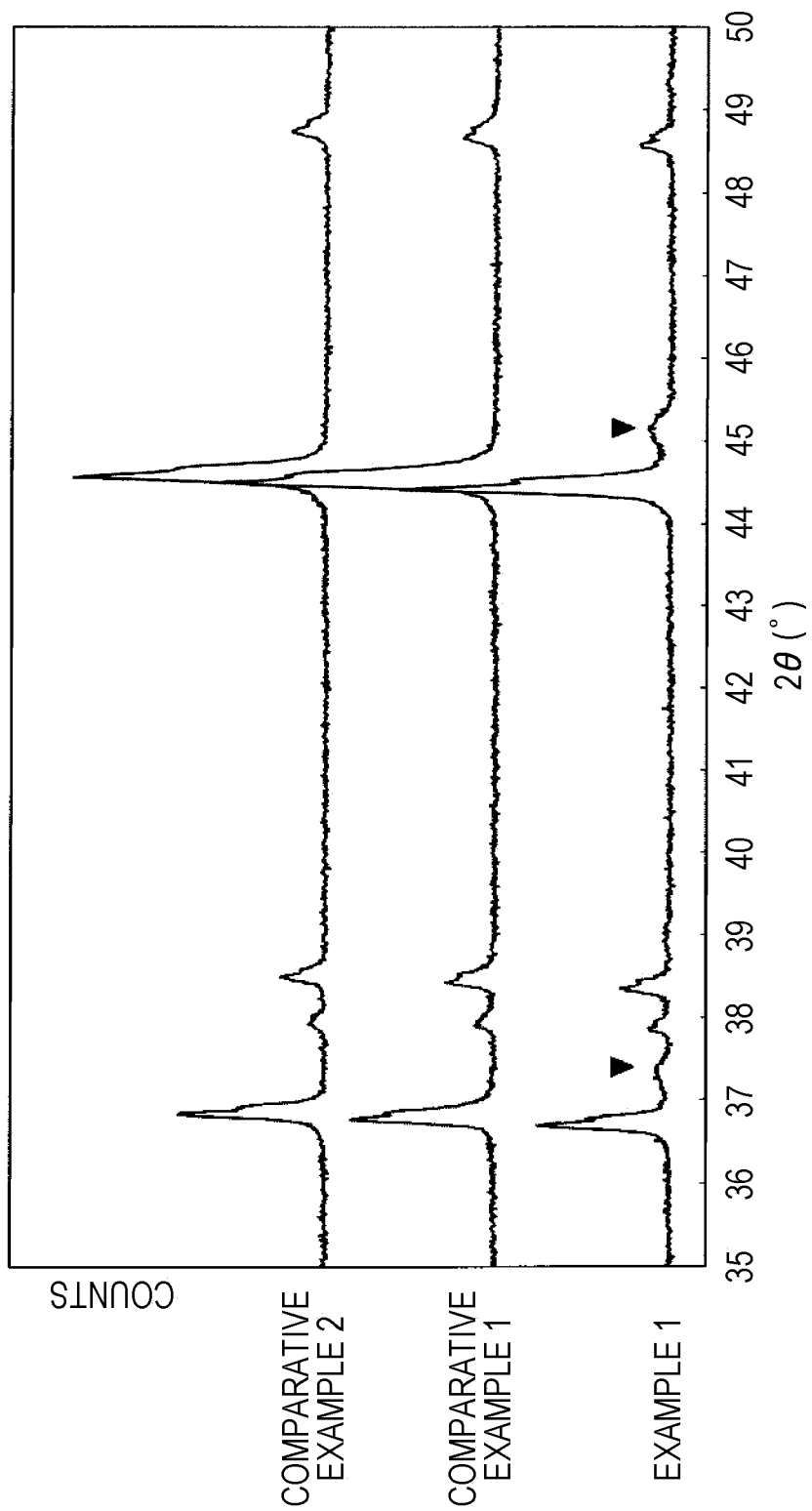
FIG. 5 is an enlarged view of a portion of a powder X-ray diffraction pattern of a lithium composite oxide produced in each of an example and comparative examples.

With respect to the lithium composite oxide A1, the crystal structure of crystallites contained in primary particles was identified by powder X-ray diffractometry (using powder XRD measurement device RINT2200 (X-ray source Cu-Kα) manufactured by Rigaku Corporation) analysis. FIG. 4 shows a powder X-ray diffraction pattern (2θ=10° to 100°) of the lithium composite oxide A1, and FIG. 5 is an enlarged view of the powder X-ray diffraction pattern (2θ=35° to 50°) shown in FIG. 4.

As a result of analysis of the lithium composite oxide A1, a diffraction peak showing a layered rock salt-type crystal structure was detected near 2θ=44.5°, and diffraction peaks of the space group Fd-3m with a spinel crystal structure were detected near 2θ=19°, 37°, and 45°. In FIGS. 4 and 5, the detected diffraction peaks of the space group Fd-3m are shown by black down-pointing triangles. Also, as a result of determination by comparison with an X-ray diffraction pattern of a standard sample, the content of crystallites having the spinel crystal structure in the lithium composite oxide A1 was 2% by mass relative to the total amount of primary particles.

As a result of calculation of the composition of the lithium composite oxide A1 by ICP emission spectroscopy (using ICP (inductively coupled plasma) emission spectrophotometer "iCAP6300" manufactured by Thermo Fisher Scientific Inc., this is applied to description below), the composition was $Li_{1.05}Ni_{0.33}Co_{0.33}Mn_{0.33}O_2$. Also, as a result of observation with a scanning electron microscope (SEM), the average particle diameter of the primary particles constituting the lithium composite oxide A1 was 1.5 μm.

With respect to the lithium composite oxide A1, a powder X-ray diffraction pattern was measured by using a powder X-ray diffraction measurement device (D8 advance diffractometer manufactured by Brukar AXS K. K.). Based on this X-ray diffraction pattern, the crystallite size was calculated by the Le Bail method through Rietveld analysis according to Topas Version 4. As a result, the crystallite size was 100 nm.

The lithium composite oxide A1 was sieved by using a 350-mesh sieve to remove particles with excessively small and large diameters, thereby producing the positive electrode active material A1. The volume-average particle diameter (D50) of the positive electrode active material A1 was 10 μm. The volume-average particle diameter (D50) of the positive electrode active material A1 was determined by preparing a dispersion solution of the positive electrode active material A1 in water used as a dispersion medium and measuring the dispersion solution with a laser diffraction scattering particle size distribution analyzer (trade name "LA-920" manufactured by Horiba, Ltd.).

As a result of measurement according to the method described above using a micro compression testing machine (model name "MCT-211" manufactured by Shimadzu Corporation), the compression breaking strength of the positive electrode active material A1 was 300 MPa (the particle diameter regulated to be 7 μm). As a result of measurement according to the method described above using an absorption tester (model name "S-500" manufactured by Asahi-souken Co., Ltd.), the oil absorption of the positive electrode active material A1 was 15 $cm^3$/100 g. Further, as a result of measurement and calculation according to the method described above based on a SEM image of the positive electrode active material A1, the surface roughness of the positive electrode active material A1 was 3%.

Next, 97.5% by mass of the positive electrode active material A1 produced as described above, 1% by mass of a carbon powder (carbon black) serving as a conductive agent, and 1.5% by mass of polyvinylidene fluoride powder serving as a binder were mixed. The resultant mixture was mixed with a N-methyl-2-pyrrolidone (NMP) solution to prepare a slurry. The resultant slurry was applied by a doctor blade method on both surfaces of a positive electrode core made of aluminum and having a thickness of 15 μm to form positive electrode active material layers. The coating film was dried and then compressed by using a compression roller under high pressure so that the active material density was 3.5 g/$cm^2$. After compression, the core was cut to a short side length of 20 mm and a long side length of 45 mm and used as a positive electrode of Example 1.

[Formation of Negative Electrode]

A mixture containing graphite and $SiO_x$ (0.8×1.2) at a mass ratio of 93:7 was used as a negative electrode active material. The negative electrode 40 was formed as follows. First, 98% by mass of the mixture used as the negative electrode active material, 1% by mass of styrene-butadiene copolymer serving as a binder, and 1% by mass of carboxymethyl cellulose serving as a thickener were mixed to prepare a mixture containing these components. Then, water was added to the resultant mixture to prepare a slurry. The resultant slurry was applied by a doctor blade method on both surfaces of a negative electrode core made of copper and having a thickness of 10 μm to form negative electrode active material layers. The coating film was dried and then compressed by using a compression roller to a predetermined density, and then the core was cut to dimensions including a short side length of 21 mm and a long side length of 46 mm, thereby forming a negative electrode.

[Preparation of Nonaqueous Electrolyte]

An electrolyte was prepared by dissolving $LiPF_6$ used as an electrolyte salt at a ratio of 1.6 mol/L in a mixed nonaqueous solvent of equal volumes of ethylene carbonate (EC) and diethyl carbonate (DEC). The electrolyte was subjected to production of a battery.

[Production of Battery]

The nonaqueous electrolyte secondary battery 10 having a structure shown in FIGS. 1 to 3 was formed according to procedures described below using the positive electrode, the negative electrode, and the electrolyte prepared as described above. That is, the positive electrode 30 and the negative electrode 40 formed as described above were stacked with the separator 50 interposed therebetween. The resultant stack was fixed by winding an insulating tape to form the stacked electrode body 20. In forming the electrode body 20, 20 positive electrodes 30 and 21 negative electrodes 40 were used. Next, in the electrode body 20, a plurality of positive electrode core exposed portions 32 were welded to form the positive electrode tab 21, and a plurality of negative electrode core exposed portions 42 were welded to form the negative electrode tab 22. The positive electrode tab 21 and the negative electrode tab 22 were bonded to the positive electrode current collector lead 23 and the negative electrode current collector lead 24, respectively. Then, the electrode body 20 was housed in the aluminum external case 11 with an angular shape having a length of 65 mm, a width of 25 mm, and a height of 10 mm, and the sealing plate 12 was bonded to the opening of the external case 11. The electrolyte was supplied through the liquid injection hole 13a of the external case 11, and then the external case 11 was sealed with the sealing plug 13. As a result, a nonaqueous electrolyte secondary battery A1 was produced.

Comparative Example 1

For a lithium composite oxide C1 of Comparative Example 1, $Li_2CO_3$ and $Ni_{0.33}Co_{0.33}Mn_{0.33}(OH)_2$ were mixed so that the molar ratio of Li relative to the total amount of Ni, Co, and Mn was 1.05. Then, the resultant mixture was maintained at 950° C. for 10 hours to prepare the lithium composite oxide C1. A positive electrode active material C1 (volume-average particle diameter (D50): 10 μm) and nonaqueous electrolyte secondary battery C1 of Comparative Example 1 were formed by the same method as in Example 1 except the lithium composite oxide C1 was used in place of the lithium composite oxide A1.

Each of the measurements of the lithium composite oxide C1 and the positive electrode active material C1 of Comparative Example 1 was performed by the same method as in Example 1. As a result, a diffraction peak due to the space group Fd-3m having the spinel crystal structure was not detected with the lithium composite oxide C1 of Comparative Example 1. Also, the lithium composite oxide C1 had a composition of $Li_{1.05}Ni_{0.33}Co_{0.33}Mn_{0.33}O_2$, the average particle diameter of primary particles was 0.2 μm, and the crystallite size was 100 nm. Further, the compression breaking strength of the positive electrode active material C1 was 120 MPa (the particle diameter regulated to be 7 μm), the oil absorption of the positive electrode active material C1 was 18 $cm^3/100$ g, and the surface roughness of the positive electrode active material C1 was 5%.

Comparative Example 2

A lithium composite oxide C2 of Comparative Example 2 was prepared by a method described below. $Li_2CO_3$ and $Ni_{0.33}Co_{0.33}Mn_{0.33}(OH)_2$ were mixed so that the molar ratio of Li relative to the total amount of Ni, Co, and Mn was 0.8. Then, the resultant mixture was maintained at 1000° C. for 10 hours (first firing) to prepare a precursor of the lithium composite oxide C2. Next, to the precursor, LiOH was added in such an amount that the molar ratio of Li relative to the total amount of Ni, Co, and Mn in the precursor of lithium composite oxide C2 was 0.25, and then both were mixed. Then, the resultant mixture was maintained at 800° C. for 10 hours (second firing) to prepare the lithium composite oxide.

A positive electrode active material C2 (volume-average particle diameter (D50): 10 μm) and nonaqueous electrolyte secondary battery C2 of Comparative Example 2 were formed by the same method as in Example 1 except the lithium composite oxide C2 was used in place of the lithium composite oxide A1.

Each of the measurements of the lithium composite oxide C2 and the positive electrode active material C2 of Comparative Example 2 was performed by the same method as in Example 1. As a result, a diffraction peak due to the space group Fd-3m with the spinel crystal structure was not detected with the lithium composite oxide C2 of Comparative Example 2. Also, the lithium composite oxide C2 had a composition of $Li_{1.05}Ni_{0.33}Co_{0.33}Mn_{0.33}O_2$, the average particle diameter of primary particles was 5 μm, and the crystallite size was 100 nm. Further, the compression breaking strength of the positive electrode active material C2 was 400 MPa (the particle diameter regulated to be 7 μm), the oil absorption of the positive electrode active material C2 was 21 $cm^3/100$ g, and the surface roughness of the positive electrode active material C2 was 4%.

[Measurement of Oxygen Releasability]

The oxygen releasability of each of the positive electrode active material A1 of Example 1, the positive electrode active material C1 of Comparative Example 1, and the positive electrode active material C2 of Comparative Example 2 was evaluated by using an evolved gas analyzer (EGA) (thermal extractor: trade name "PY-2020iD" manufactured by Frontier Lab Ltd., GC/MS apparatus: trade name "GC-Agilent 6890N, MS-Agilent 5973N manufactured by Agilent Technologies Co., Ltd.). Specifically, 2 mg of a mixture portion was cut out from each of the positive electrode plates in a charged state and placed in a temperature-rising heating device the inside of which was then replaced with inert gas (He gas). Then, the atmospheric temperature was increased from 50° C. to 800° C. at a rate of 20° C./min. The gas evolved from a sample during the temperature rising was successively analyzed by a gas chromatography-mass spectrometer, and am amount of oxygen released from the positive electrode active material was measured with temperature.

Figure 6:
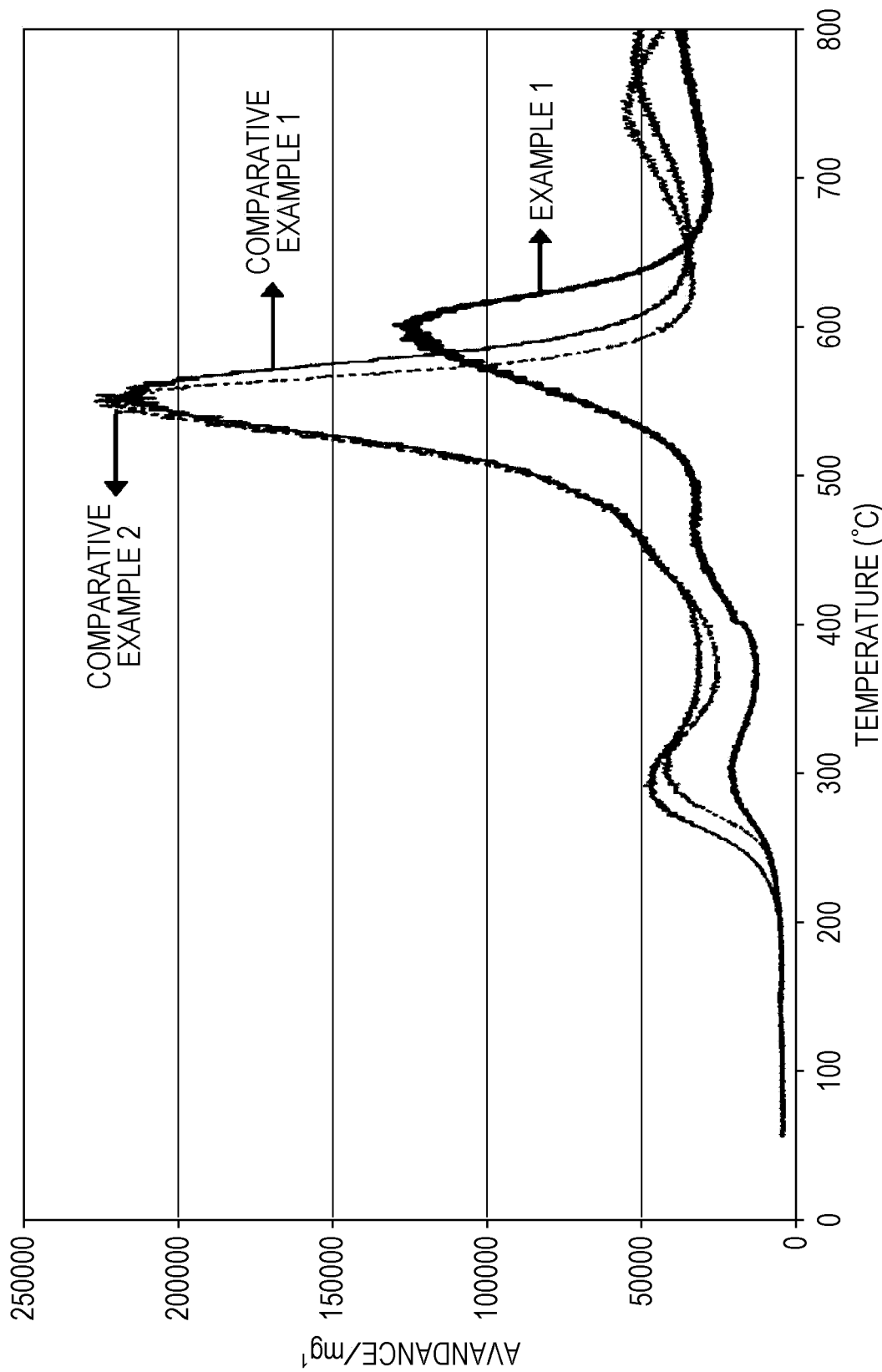
FIG. 6 is a graph showing the results of an oxygen releasing ability test using positive electrode active materials produced in an example and comparative examples.

FIG. 6 shows the amount of oxygen released in a heating test of each of the positive electrode active material A1, the positive electrode active material C1, and the positive electrode active material C2. Also, Table 1 shows the results of evaluation of the oxygen releasability of each of the positive electrode active materials. In Table 1, "Start temperature of oxygen release" is a temperature (° C.) at which a rapid increase in the detected amount of oxygen from a background is confirmed during detection and the release of oxygen from the sample is supposed to be started at the temperature. Also, "Amount of oxygen released" described in Table 1 is a detected total amount (unit: AREA/mg) of oxygen released in the heating test. The higher the start temperature of oxygen release and the smaller the amount of oxygen released, the more stable the crystal structure of the positive electrode active material even under high-temperature conditions. In this case, the oxygen release can be suppressed, and thus safety is considered to be improved.

[Measurement of Discharge Capacity and Cycle Characteristics]

The capacity retention rate after 500 cycles was determined as a charge-discharge cycle characteristic of each of the batteries produced in Example 1, Comparative Example 1, and Comparative Example 2. First, each of the batteries was charged at a constant current of 1C (time rate) at 25° C. until the battery voltage was 4.3 V and discharged at a constant current of 1C until the battery voltage was 2.5 V. At this time, the discharge capacity was regarded as the initial discharge capacity. Also, one cycle of the charge-discharge was repeated 500 times, and the capacity retention rate (%) was determined by dividing the discharge capacity at the 500th cycle by the initial discharge capacity and multiplying by 100.

Table 1 shows the presence of the spinel crystal structure in primary particles, the average particle diameter of primary particles, the start temperature of oxygen release and the amount of oxygen released in the oxygen releasability test, the initial discharge capacity, and the capacity retention rate after 500 cycles in each of Example 1, Comparative Example 1, and Comparative Example 2.

TABLE 1

| | Example No | | |
|---|---|---|---|
| | Example 1 | Comparative Example 1 | Comparative Example 2 |
| Spinel structure | Yes | No | No |
| Average particle diameter of primary particle (μm) | 1.5 | 0.2 | 5 |
| Start temperature of oxygen release (° C.) | 250 | 210 | 238 |
| Amount of oxygen released (AREA/mg) | 15731240 | 227912953 | 220544549 |
| Initial discharge capacity (mAh/g) | 160 | 159 | 159 |
| Capacity retention rate after 500 cycles (%) | 90 | 75 | 90 |

Figure 7:
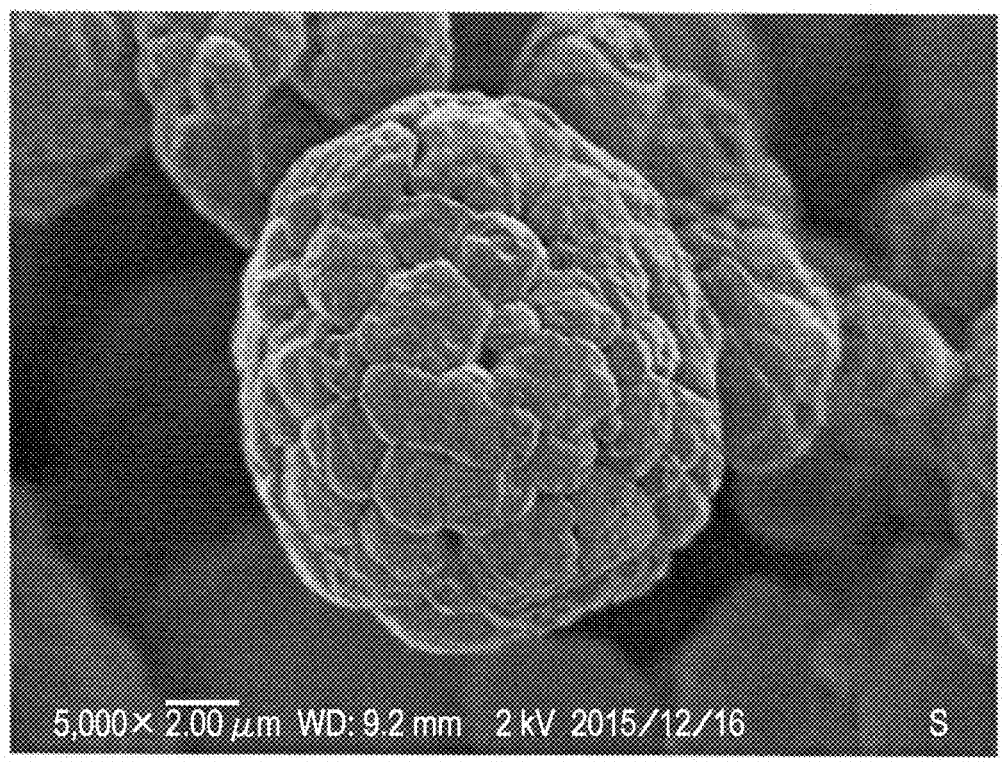
FIG. 7 is a diagram showing a SEM image of a positive electrode active material produced in Example 1.
Figure 8:
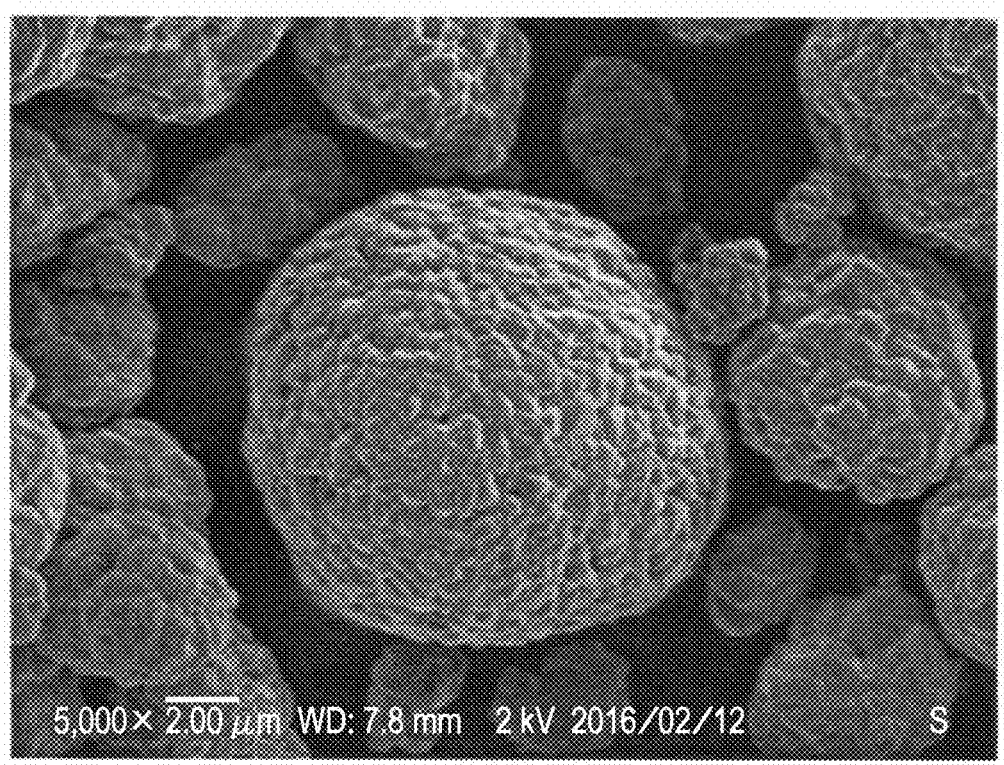
FIG. 8 is a diagram showing a SEM image of a positive electrode active material produced in Comparative Example 1.
Figure 9:
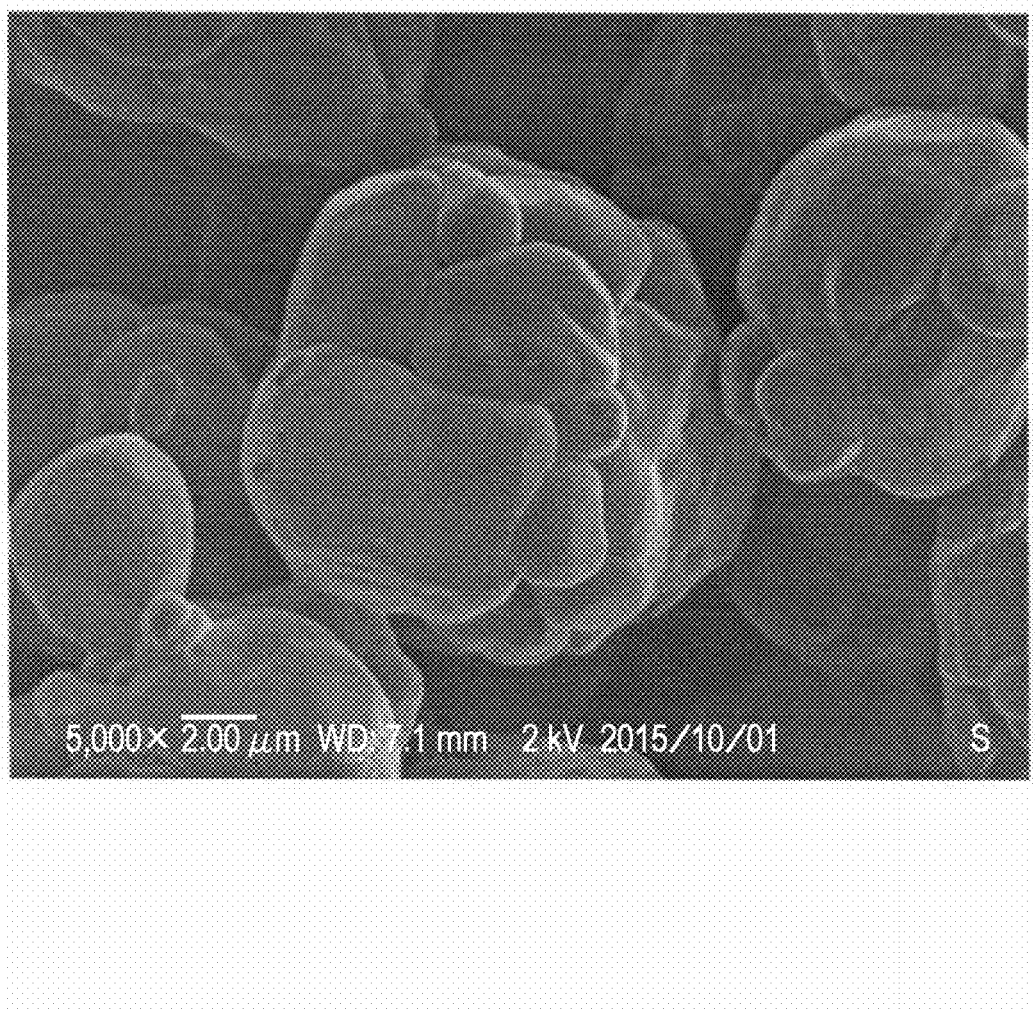
FIG. 9 is a diagram showing a SEM image of a positive electrode active material produced in Comparative Example 2.

FIGS. 7 to 9 show SEM images of the positive electrode active materials produced in Example 1, Comparative Example 1, and Comparative Example 2, respectively. As shown in FIGS. 7 to 9, any one of the positive electrode active materials produced in Example 1, Comparative Example 1, and Comparative Example 2 includes substantially spherical particles. It is also confirmed from the SEM images that the positive electrode active material of Example 1 has less surface roughness than the positive electrode active materials of Comparative Example 1 and Comparative Example 2.

Comparison of Example 1 with Comparative Examples 1 and 2 indicates that all the positive electrode active materials have substantially the same initial discharge capacity, but a decrease in the capacity retention rate is found in the positive electrode active material of Comparative Example 1. This is considered to be due to the fact that the positive electrode active material of Comparative Example 1 has low particle strength, and thus cleavage occurs at the primary particle interfaces due to expansion and contraction of the positive electrode active material in charging/discharging.

The positive electrode active material of Example 1 shows a high start temperature of oxygen release and a decreased amount of oxygen released. The positive electrode active material of the present disclosure includes primary particles having therein the layered crystal structure and the spinel crystal structure which has stronger bond between atoms than in the layered crystal structure. It is thus considered that the oxygen releasability of the positive electrode active material is suppressed as a whole.

According to an embodiment of the present disclosure, it is possible to produce a nonaqueous electrolyte secondary battery in which the oxygen releasability of a positive electrode active material is suppressed, and safety is improved while the battery contains a positive electrode active material filled at a high filling density and has a high energy density and excellent cycle characteristics.

The positive electrode active material for a nonaqueous electrolyte secondary battery of the present disclosure is not limited to the embodiment described above and may have, for example, configurations described in the following items.

[Item 1]

A positive electrode active material for a nonaqueous electrolyte secondary battery, the positive electrode active material being used for a nonaqueous electrolyte secondary battery, the positive electrode active material including a composite oxide containing at least lithium, nickel, and manganese and containing aggregated particles of primary particles having an average particle diameter of 1.0 μm or more, wherein the primary particles have a layered crystal structure and a spinel crystal structure.

[Item 2]

The positive electrode active material for a nonaqueous electrolyte secondary battery described in item 1, wherein the compression breaking strength is 150 MPa or more and 500 MPa or less, and the crystallite size is 80 nm to 220 nm.

[Item 3]

The positive electrode active material for a nonaqueous electrolyte secondary battery described in item 1 or 2, wherein the oil absorption is 20 $cm^3$/100 g or less.

[Item 4]

A nonaqueous electrolyte secondary battery including a plate-shaped positive electrode, a plate-shaped negative electrode, a separator disposed between the positive electrode and the negative electrode, and a nonaqueous electrolyte, wherein the positive electrode contains the positive electrode active material for a nonaqueous electrolyte secondary battery described in any one of items 1 to 3.

[Item 5]

The nonaqueous electrolyte secondary battery described in item 4, wherein the active material density of the positive electrode is 3.5 $g/cm^3$ or more.

[Item 6]

A method for producing a positive electrode active material for a nonaqueous electrolyte secondary battery, the method including two times or more of firing including first firing of a first mixture containing a lithium compound and a transition metal compound containing nickel and manganese and second firing of a second mixture prepared by further adding a lithium compound to the precursor particles produced by the first firing, wherein the lithium content in the first mixture corresponds to a molar ratio of less than 0.5 to the total amount of the transition metals; and the lithium content in the second mixture corresponds to a molar ratio of 0.9 or more and 1.1 or less to the total amount of the transition metals.

What is claimed is:

1. A positive electrode active material for a nonaqueous electrolyte secondary battery, comprising a composite oxide containing at least lithium, nickel, and manganese and containing aggregated particles of primary particles having an average particle diameter of 1.0 μm or more and 5.0 μm or less, wherein the primary particles have a layered crystal structure and a spinel crystal structure, wherein the active material density of the positive electrode is 3.5 g/cm$^3$ or more, and wherein a content of crystallites having the spinel crystal structure is 0.1% by mass or more and 5% by mass or less relative to a total content of the primary particles, wherein a content of crystallites having the layered crystal structure is 95% by mass or more and 99.9% by mass or less relative to the total content of the primary particles, wherein the compression breaking strength is 150 MPa or more and 500 MPa or less, and the crystallite size is 80 nm to 220 nm.

2. The positive electrode active material for a nonaqueous electrolyte secondary battery according to claim 1, wherein the oil absorption is 20 cm$^3$/100 g or less.

3. A nonaqueous electrolyte secondary battery comprising a plate-shaped positive electrode;
a plate-shaped negative electrode;
a separator disposed between the positive electrode and the negative electrode; and
a nonaqueous electrolyte, wherein the positive electrode contains a positive electrode active material for a nonaqueous electrolyte secondary battery, comprising a composite oxide containing at least lithium, nickel, and manganese and containing aggregated particles of primary particles having an average particle diameter of 1.0 μm or more and 5.0 μm or less, wherein the primary particles have a layered crystal structure and a spinel crystal structure, wherein the active material density of the positive electrode is 3.5 g/cm$^3$ or more, and wherein a content of crystallites having the spinel crystal structure is 0.1% by mass or more and 5% by mass or less relative to a total content of the primary particles, wherein a content of crystallites having the layered crystal structure is 95% by mass or more and 99.9% by mass or less relative to the total content of the primary particles, wherein the compression breaking strength is 150 MPa or more and 500 MPa or less, and the crystallite size is 80 nm to 220 nm.

* * * * *